United States Patent [19]

Holzman

[11] 4,186,998
[45] Feb. 5, 1980

[54] OPTICAL INTERCONNECTING DEVICE HAVING TAPERED SURFACES

[75] Inventor: Melvyn A. Holzman, Boulder, Colo.

[73] Assignee: The Deutsch Company Electronic Components Division, Banning, Calif.

[21] Appl. No.: 915,462

[22] Filed: Jun. 14, 1978

[51] Int. Cl.² .............................................. G02B 5/14
[52] U.S. Cl. ............................ 350/96.21; 350/96.17; 350/96.20
[58] Field of Search ............... 350/96.15, 96.16, 96.17, 350/96.18, 96.20, 96.21, 96.22, 320

[56] References Cited

U.S. PATENT DOCUMENTS

| | | | |
|---|---|---|---|
| 3,405,992 | 10/1968 | Hutson et al. | 350/147 |
| 3,508,807 | 4/1970 | Mayer | 350/96.18 |
| 3,532,038 | 10/1970 | Rottmann | 350/179 |
| 3,666,345 | 5/1972 | Maslowski | 350/3.61 |
| 3,832,030 | 8/1974 | Gloge | 350/96.18 |
| 3,864,019 | 2/1975 | Smolinsky et al. | 350/96.17 |
| 3,871,744 | 3/1975 | Bridger et al. | 350/96.21 |
| 3,900,245 | 8/1975 | Dyott et al. | 350/96.21 |
| 3,901,581 | 8/1975 | Thiel | 350/96.16 |
| 3,910,677 | 10/1975 | Becker et al. | 350/96.18 |
| 3,912,364 | 10/1975 | Hudson | 350/96.16 |
| 3,966,299 | 6/1976 | Osterfield et al. | 350/96.21 |
| 3,975,082 | 8/1976 | Winzer | 350/96.19 |
| 3,995,935 | 12/1976 | McCartney | 350/96.15 |
| 4,030,810 | 6/1977 | Khoe | 350/96.21 X |
| 4,087,158 | 5/1978 | Lewis et al. | 350/96.21 |
| 4,101,197 | 7/1978 | Kent et al. | 350/96.17 |
| 4,107,242 | 8/1978 | Runge | 350/96.20 X |
| 4,119,362 | 10/1978 | Holzman | 350/96.18 |

*Primary Examiner*—John K. Corbin
*Assistant Examiner*—John D. Lee
*Attorney, Agent, or Firm*—Gausewitz, Carr & Rothenberg

[57] ABSTRACT

This invention provides an optical fiber connector in which axially aligned, inwardly tapering openings are provided in opposite sides of a member and interconnected at their inner ends, a quantity of matching optical fluid is positioned within the openings and cylindrical optical fibers are pressed axially into the openings so that their end corners engage the tapered walls of the openings to align the fibers and position their end faces in close adjacency. The fibers displace some of the optical fluid as they enter the openings so that the fluid occupies the space between their end faces. The fiber alignment principle may be used as well in connecting a fiber to a light source or a fiber to a detector.

17 Claims, 8 Drawing Figures

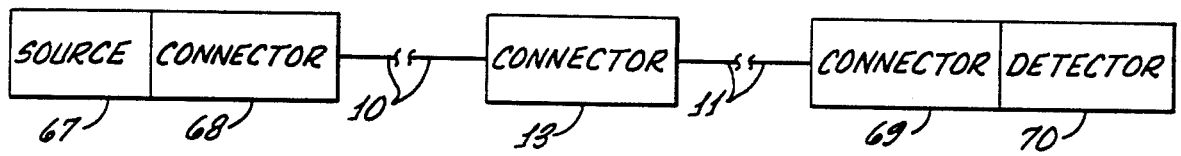
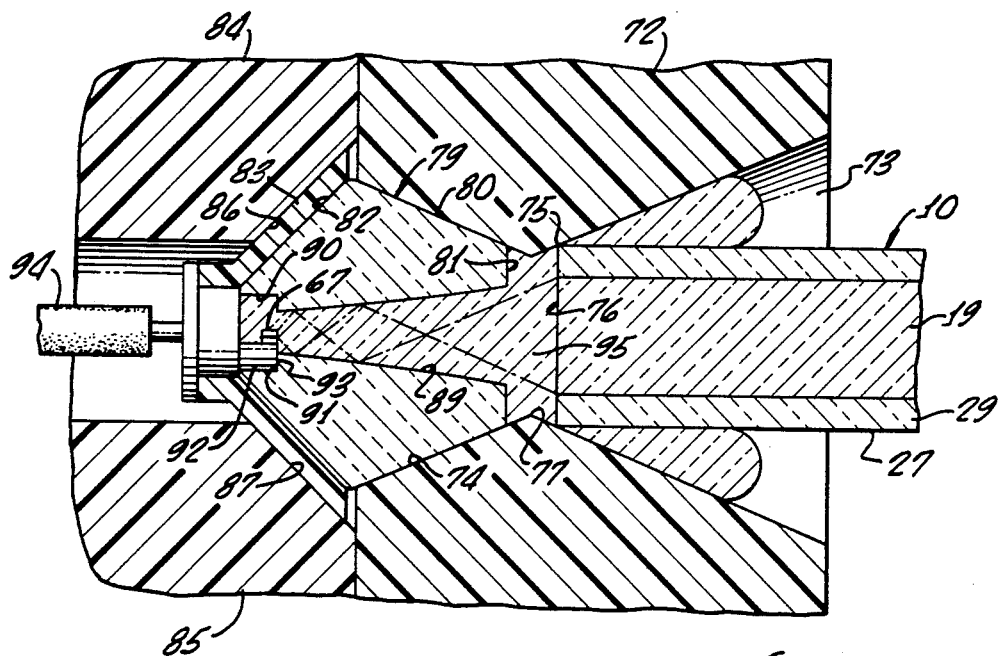

OPTICAL INTERCONNECTING DEVICE HAVING TAPERED SURFACES

BACKGROUND OF THE INVENTION

1. Field of the Invention

This invention relates to the interconnection of optical fibers.

2. Description of the Prior Art

Optical fibers may be coupled by butting their end faces together so that light from the core of one fiber is transmitted to the core of the other. Actual engagement of the end faces is not necessary if they are positioned close to each other and a matching fluid, having the same index of refraction of that of the cores of the fiber, occupies the space between their end faces. Efficiency of coupling is achieved only if there is precise axial alignment of the two fibers. Even small differences will cause substantial losses. In the past, precise fiber alignment has been obtainable only under controlled conditions and by making time-consuming delicate adjustments in fiber positions. Connectors of that sort are not practical for field use, because of the necessity for such adjustments.

Fiber alignment is accomplished by the arrangement disclosed in my co-pending application, Ser. No. 767,692, filed Feb. 11, 1977, now U.S. Pat. No. 4,119,362, for OPTICAL FIBER CONNECTOR, in which the fiber ends are pressed axially into tapered cavities in a light-transmissive member from one fiber to the other.

SUMMARY OF THE INVENTION

The present invention provides for precise fiber alignment in a connector that does not utilize a lens system. Instead, the fiber ends are positioned close to each other and a matching fluid occupies the space between them. The connector of this invention does not require skilled operators because the fibers are automatically aligned with great precision so that efficient coupling results. Mating of the connector is accomplished rapidly without adjustments or the use of instruments.

The device of this invention includes a member having opposite sides with axially aligned inwardly tapering openings formed in these opposite sides. These openings, which may be frustoconical in shape, are interconnected at their inner ends. An optical fluid, having the same index of refraction as the cores of the fibers to be connected, is introduced into these openings. Then the fibers are pressed axially into the openings, displacing a quantity of the optical fluid as this occurs. The end corners of the fibers form abutments that bear against the tapered surfaces of the openings so that the axial bias on the fibers causes them to become aligned with the axes of the openings and hence with each other. The optical fluid is displaced as this occurs and entirely fills the space between the end faces of the fibers when the connection is completed. The result is an easily mated connector that will result in exact fiber positioning and hence can achieve efficient light transmission.

The tapered opening is used also in connecting an optical fiber to a light source and in fiber to detector coupling.

BRIEF DESCRIPTION OF THE DRAWINGS

FIG. 6 is a schematic view of a system utilizing connectors of this invention;

FIG. 7 is an enlarged fragmentary longitudinal sectional view illustrating an arrangement for connecting a fiber to a light source; and FIG. 8 is an enlarged fragmentary longitudinal sectional view illustrating an arrangement for the connection of a fiber to a detector.

DESCRIPTION OF THE PREFERRED EMBODIMENT

Figure 1:
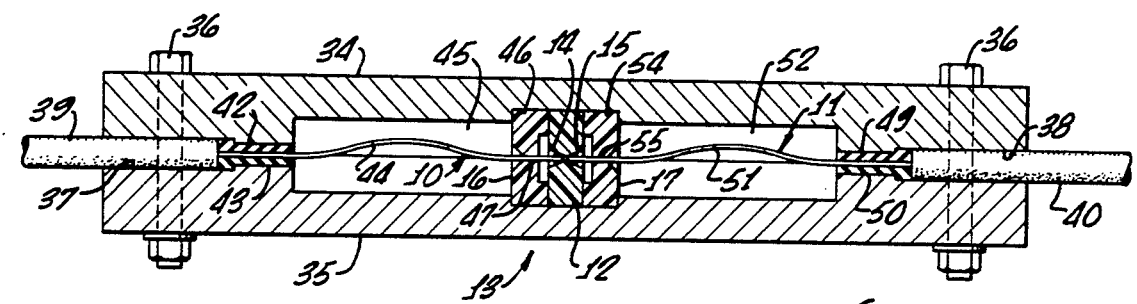
FIG. 1 is a transverse sectional view of an optical fiber connector embodying this invention.
Figure 2:
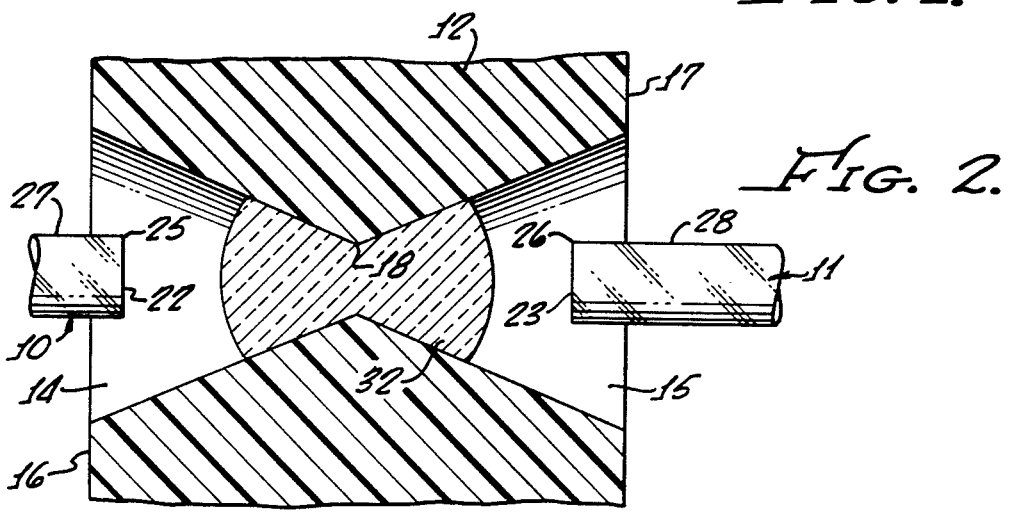
FIG. 2 is an enlarged fragmentary transverse sectional view of the portion of the connector that receives and aligns the fibers, prior to the insertion of the fibers therein.
Figure 3:
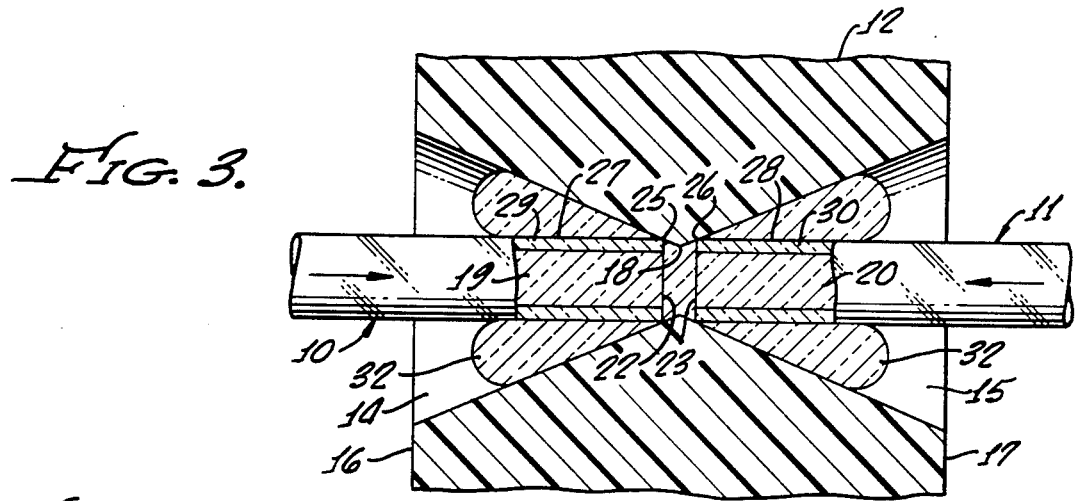
FIG. 3 is a view similar to FIG. 2, after the fibers have been inserted.

The optical fibers 10 and 11, either of the step index or graded index type, are connected at a block 12 at the center of the connector 13 shown in FIGS. 1, 2, and 3. Typically, the block 12 is molded of rigid plastic material. An opening extends through the block 12, having two axially aligned portions that extend inwardly from the ends of the opening at the outside faces 16 and 17 of the block 12, meeting at the center of the block. The portions 14 and 15 of the opening, in the embodiment of FIGS. 1 and 2, are frustoconical in shape, defined by walls that taper inwardly. The intermediate portion 18 of the opening, at the juncture of the apical ends of the portions 14 and 15, is only slightly smaller than the outside diameters of the fibers 10 and 11. However, the opening 18 is larger than the diameters of the cores 19 and 20 of the fibers 10 and 11.

The fibers 10 and 11 are cylindrical with flat forward end faces 22 and 23, respectively, which are perpendicular to the axes of the fibers. This provides the ends of the fibers with corners 25 and 26 where their end faces 22 and 23 join the circumferential surfaces 27 and 28 provided by the outer surfaces of the cladding 29 and 30 of the two fibers.

When the connector is assembled, the fibers 10 and 11 are pressed axially into the opposite ends of the opening, entering the end portions 14 and 15, respectively. The axial movement of the fibers into the opening causes the corners 25 and 26 to engage the inwardly tapering walls of the end portions 14 and 15 of the opening. The parts are proportioned so that, when the inward movement of the fibers is terminated, the engagement of the corners 25 and 26 is close to the central opening 18 and the end faces 22 and 23 are immediately adjacent each other but are not touching.

A displaceable optical matching material, such as an optical matching fluid 32, which is a transparent fluid of the same index of refraction as the cores 19 and 20 of the fibers 10 and 11, is introduced into the opening before the fibers 10 and 11 are pushed into the cavities, as indicated in FIG. 2. An excess of the fluid 32 is provided so that, as the fibers 10 and 11 enter the opening, they displace a portion of the fluid 32 and this fluid entirely fills the space between the end faces 22 and 23 of the fibers. The fluid 32 lubricates the fiber ends so that they slide along the tapered surfaces of the opening without damage either to the fibers or the block 12.

The tapered walls of the frustoconical end portions 14 and 15 of the opening provide an important function in axially aligning the fibers 10 and 11. This results from the engagement of the corners 25 and 26 with the tapered opening walls. With the corners 25 and 26 being symmetrical about the axes of the fibers 10 and 11, their engagement with the tapered opening surfaces and the axial inward force imposed upon the fibers will cause the fibers to become aligned with the axes of the portions 14 and 15 of the opening and hence with each other. This axial alignment will occur irrespective of differences in the outside diameter of the fibers 10 and 11 which may arise from manufacturing tolerances. As a result there is precise fiber alignment and very efficient transmission of light between the two fibers.

The provision of two tapered sections to the opening (the frustoconical portions 14 and 15) which meet at their narrow ends is advantageous in allowing the fiber end faces 22 and 23 to be very close to each other, which is necessary to avoid excessive losses in the transmission of light. Also, with the central part 18 of the opening being of greater diameter than the cores of the fibers, the wall of the opening does not obstruct the transmission of light from one fiber to the other.

It is possible to connect unclad fibers by this arrangement, and ferrules can be fitted on the fibers to form the corners that engage the tapered wall of the opening for aligning the fibers.

The remaining components of the connector may vary so long as they suitably hold the fibers and press them axially into the cavities of the block 12. A suitable design of this type is disclosed in application Ser. No. 874,558, filed Feb. 2, 1978, for CONNECTOR FOR OPTICAL FIBERS. Another arrangement is shown in FIG. 1, the connector including opposed members 34 and 35, held together by bolts 36. Openings 37 and 38, defined by the outer ends of the two members 34 and 35, receive the fibers 10 and 11, along with their protective outer coverings 39 and 40. Opposed resilient clamping members 42 and 43, at the inner end of the opening 37, are pressed toward each other by the opposed outer members 34 and 35. This causes the clamping members 42 and 43 to bear against the fiber 10 where the outer covering 39 has been stripped away, thereby gripping the fiber at a location remote from the central block 12. There is an excess of the length of the fiber 10 within the connector so that the fiber becomes bent. The resulting bowed portion 44 is formed within an opening 45, defined by the two member 34 and 35, which provides adequate clearance. This arrangement means that the fiber 10 provides a resilient force that biases its end toward the cavity 14. A guide member 46, inwardly of the clamping members 42 and 43, and the bowed portion 44, has an opening 47 that receives the end portion of the fiber adjacent the outer face 16 of the block 12, directing the fiber 10 toward the end portion of the opening.

The opposite side of the connector is the same, with the resilient members 49 and 50 gripping the fiber 11, which is provided with a bow 51 in an opening 52, defined by the members 34 and 35. A guide member 54, with an opening 55, directs the fiber 11 toward the cavity 15.

Figure 4:
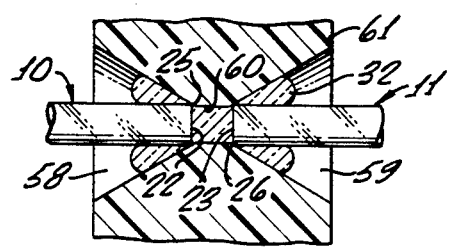

Variations may be made in the shape of the opening such as that shown in FIG. 4. Here the end portions 58 and 59 of the opening again are frustoconical, but instead of meeting at their apical ends, they connect to a short cylindrical opening 60 at the center of the block 61. The corners 25 and 26 engage the tapered surfaces as before and effectively align the axes of the fibers 10 and 11. The central opening 60, in this embodiment, must be very short, because the end faces 22 and 23 of the fibers should be close together for efficient coupling of the fibers. Optical matching fluid 32 is provided, as before.

Figure 5:
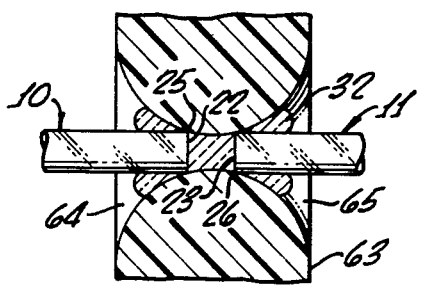
FIGS. 4 and 5 are longitudinal sectional views showing modifications of the member that receives the fiber.

In the embodiment of FIG. 5, the opening in the member 63 is of compound curvature, with the walls of the end portions 64 and 65 being convex in cross section. The two portions 64 and 65 meet at the center of the member 63, forming a continuous curve. As before, the ends of the opening are tapered and cause the axes of the fibers to be accurately aligned, while at the same time positioning the end faces 22 and 23 close to each other. As in the other embodiments, a matching fluid 32 is included within the opening, the fluid being displaced by the fibers as they enter the cavities to entirely fill the space between the two fibers.

The techniques of this invention may be utilized in source-to-fiber coupling and fiber-to-detector coupling, as well as in fiber-to-fiber coupling. A system of this type, as shown schematically in FIG. 6, includes a light source 67, joined by a connector 68 to the optical fiber 10, which receives light emitted by the source. The connector 13 in the system allows light from the fiber 10 to enter receiving fiber 11. An additional connector 69 causes the light from the fiber 11 to be received by a detector 70 which forms the output of the system.

The use of a laser diode for the light source 67 offers attractive possibilities because of its relatively high power, its monochromatic characteristics and the ease with which it can be handled. A problem arises, however, from the fact that a typical lase diode produces an elliptical beam which has a large divergence in a direction perpendicular to the longitudinal dimension of the laser diode's stripe emitting area. Usually the stripe emitting area of the laser diode is much smaller than the core area of a multimode fiber. Ordinary coupling designs will not efficiently couple a laser diode to a multimode fiber, which has a conical acceptance pattern of less divergence than that of the beam of the laser diode. Even butting the end of the fiber against the laser diode does not alleviate the inefficient coupling because the extremely divergent emitted rays will not couple to the fiber. The alignment technique of this invention, however, provides a simplified connection with vastly improved efficiency.

The connector 68, shown in enlarged fragmentary cross section in FIG. 7, includes a block 72 which may be made of molded plastic. Within the block 72 is an opening having axially aligned inwardly tapering end portions 73 and 74, frustoconical in the embodiment shown, that meet at the central portion of the block.

The fiber 10 extends into the portion 73 of the opening with its end corner 75 bearing against the tapered wall of the opening. The fiber 10 is pressed axially into the portion 73 of the opening so that the fiber exerts an axial force against the tapered wall and a centering effect is accomplished. This precisely aligns the axis of the fiber 10 with the axis of the end portion 73 of the opening. The end face 76 is positioned very close to the intermediate part 77 of the opening, which has a diameter just slightly smaller than the diameter of the fiber.

Within the other end portion 74 of the opening is a plug 79 of transparent material such as plastic or glass having a forward outer surface 80 that complementarily engages the frustoconical wall of the portion 74 of the opening and terminates at a transverse end face 81. At the rearward end of the plug 79 is a tapered surface 82 which is frustoconical in shape and at its outer edge meets the outer perimeter of the forward surface 80. A gasket 83 of a resilient elastomer or similar material fits over the rearward end surface 82. On the outside of the gasket 83 are clamping members 84 and 85 which present tapered surfaces 86 and 87, which are parallel to the surface 82 of the plug 79. Therefore, when the connector 68 is assembled, the clamping members 84 and 85 react through the gasket 83 to bias the plug 79 inwardly relative to the end portion 74 of the opening. This assures engagement of the plug surface 80 with the wall of the portion 74 of the opening. With these two engaging surfaces being tapered, the plug 79 is centered and aligned relative to the portion 74 of the opening as the connector is assembled.

Along the axis of the plug 79 is an opening 89 of circular cross section, which extends inwardly from the forward end face 81 to an inner end near the rearward portion of the plug 79. The opening 89 is tapered, diverging toward the end face 81.

An additional opening 90, which may be cylindrical and which is axially aligned with the opening 89, extends inwardly from the rearward end of the plug 79, being of a larger diameter than the inner end of the opening 89. Consequently, the opening 90 terminates at a shoulder 91 where it connects to the opening 89. Complementarily received in the opening 90 is a support block 92, the forward end 93 of which bears against the shoulder 91. Carried by the support block 92 at its forward end 93 is the laser diode 67. The laser diode 67 is centered with respect to the forward face 93 of the support block 92, and, consequently, is centered with respect to the tapered opening 89. The electrical lead 94 for the laser diode extends rearwardly through the connector away from the support 92.

Within the opening 89 and within the intermediate and end portions 77 and 73 of the block 72 forwardly of the plug 79 is an optical material 95, such as a matching index of refraction fluid. This fluid engages the laser diode 67 and entirely fills the space between the laser diode and the end face 76 of the fiber 10.

The opening 89 acts as a tapered waveguide, which causes the spatial extent of the laser diode radiance to become expanded in return to less angular divergence. The effective launch area is converted to a circular cross section with an axially symmetrical divergence pattern. The index of refraction of the fluid 95 and of the plug 79 are selected so as to cause the light from the laser diode 67 to experience total internal reflection along the wall of the opening 89 as it travels the length of this opening. By making the waveguide opening 89 sufficiently long and with optimum taper, mixing of the light will be achieved as the light is reflected repeatedly from the laser diode source to the forward end. This enables optimum radiance distribution to be obtained at the emitting end of the tapered waveguide, based upon the parameters of the receiving fiber, such as index profile, core size, and the numerical aperture. The angular distribution of the beam as it emerges at the end surface 81 is changed so that the large divergent characteristic of the laser diode radiance distribution no longer exists. In exchange, the emitting area is larger. The beam angle has less divergence relative to the optical axis (the axis of the waveguide 89 and the portion 74 of the opening in the block 72) and so can be transmmitted to the receiving fiber more efficiently.

A light emitting diode of the edge emitting type has a stripe emitting area which produces an elliptical beam generally similar to that of a laser diode. The emitting area of such an LED may be larger than that of a laser diode, but nevertheless smaller than the core area of a multimode optical fiber. Accordingly, the same approach is used in coupling an edge emitting LED to an optical fiber in accordance with this invention as that described above for the connection of a laser diode.

When the light source for the optical system is a surface emitting light emitting diode, usually its area and emittance angle are such that its mode volume is greater than the mode volume of the receiving fiber. The system of this invention is useful with such light sources as a convenient means for connecting the source and fiber and as an alignment medium. This enables the fiber to be aligned properly in the radiance field to obtain optimum coupling to the LED. In this case, the LED may be positioned adjacent the inner end of a tapered opening receiving the end of the fiber with a matching fluid in the opening.

In the arrangement shown in FIG. 8, the fiber 11 is connected to a small area detector, such as one of an area comparable to the emitting fiber core area or less. The end of the fiber 11 is received in a frustoconical, inwardly tapered opening 97 in a block 98, biased axially toward the wall of the opening so that the fiber is centered in the opening. Opposite and in alignment with the opening 97, positioned by a support 99, is the detector 70. A matching fluid 100 occupies the space in the opening 97 and the detector 70. This locates the detector 70 adjacent the opening 97 just beyond the portion of the opening where the end corner of the fiber engages the tapered wall of the opening. Consequently, substantially all of the light emitted from the fiber core is transmitted to the detector 70.

The foregoing detailed description is to be clearly understood as given by way of illustration and example only, the spirit and scope of this invention being limited solely by the appended claims.

I claim:

1. An optical interconnecting device comprising a member having an opening therein,
said opening having an inner portion, and a tapered portion defined by a wall tapering inwardly to said inner portion,
means for emitting light,
said means for emitting light being aligned with and positioned to emit light toward said tapered portion,
an optical fiber,
said optical fiber having a central core, a cladding around said core defining a cylindrical outer surface, a substantially flat end face perpendicular to the axis thereof, and a corner between said outer surface and said end face,
said inner portion of said opening having a diameter which is less than that of said cylindrical outer surface and greater than that of said core,
means engaging said fiber and pressing the same axially into said opening so that said corner thereof engages said wall of said tapered portion adjacent said inner portion and said optical fiber is aligned axially with said tapered portion and said means for emitting light, and an optical material between said end face and said means for emitting light.

2. A device as recited in claim 1 in which said means for emitting light is a second optical fiber.

3. A device as recited in claim 1 in which said means for emitting light is a light source which generates the light emitted thereby.

4. A device as recited in claim 1 in which said tapered portion of said opening is substantially frustoconical.

5. An optical interconnecting device comprising
a member having an opening therein,
said opening having an inner portion, and a tapered portion defined by a wall tapering inwardly to said inner portion,
means for emitting light,
said means for emitting light being aligned with and positioned to emit light toward said tapered portion, and including a light source producing a beam of noncircular shape and relatively large divergence, and a tapered waveguide receiving said beam and mixing and reflecting the same so that light emitted therefrom is in a beam of substantially circular shape and is less divergent than said beam emitted by said source,
an optical fiber,
said optical fiber having a cylindrical outer surface, a substantially flat end face perpendicular to the axis thereof, and a corner between said outer surface and said end face,
said tapered waveguide being adjacent and in communication with said inner portion and being axially aligned with said tapered portion and hence with said optical fiber,
means engaging said fiber and pressing the same axially into said opening so that said corner thereof engages said wall of said tapered portion adjacent said inner portion and said optical fiber is aligned axially with said tapered portion and said means for emitting light, and an optical material between said end face and said means for emitting light, said optical material engaging said light source and filling said opening beyond said tapered waveguide.

6. A device as recited in claim 5 in which said light source has a stripe emitting area producing a beam having a substantially elliptical pattern.

7. A device as recited in claim 6 in which said light source is a laser diode.

8. A device as recited in claim 6 in which said light source is a light emitting diode.

9. An optical fiber connector comprising
a duality of optical fibers,
each of said optical fibers having a central core, a cladding around said core defining a cylindrical outer surface, a substantially flat end face perpendicular to the axis thereof, and a corner between said end face and said outer surface,
a member having an opening therethrough,
said opening having two outer ends, an intermediate portion of relatively small lateral dimension, and two axially aligned tapered portions positioned one on either side of said intermediate portion,
each of said tapered portions being defined by a wall tapering inwardly toward said intermediate portion, said intermediate portion of said opening having a diameter which is less than that of said outer surfaces of said fibers and greater than that of said cores of said fibers,
means for engaging each of said optical fibers for pressing the same axially into one of said ends of said openings so that said corner thereof engages said wall of one of said tapered portions, for thereby causing said optical fibers to become axially aligned with said tapered portions and with each other, and positioning said end faces of said optical fibers opposite each other and closely spaced apart,
and an optical material in said opening filling the space between said end faces.

10. A device as recited in claim 9 in which said tapered portions are frustoconical in shape.

11. A device as recited in claim 10 in which each of said tapered portions has a relatively narrow inner end, said tapered portions meeting at said inner ends thereof, said intermediate portion being defined by the juncture of said tapered portions.

12. A device as recited in claim 9 in whch said intermediate portion is defined by a relatively short cylindrical wall, said cylindrical wall being connected to said walls of said tapered portions.

13. A device as recited in claim 9 in which said means for engaging each of said optical fibers includes means for gripping each of said fibers at a location remote from said member.

14. A device as recited in claim 9 including a guide means adjacent each of said outer ends of said opening for directing said optical fibers toward said opening.

15. A device as recited in claim 14 in which each of said guide means includes an additional member having an opening therein, said optical fibers extending through said openings in said additional members.

16. A device as recited in claim 15 in which said means for engaging each of said fibers include means for gripping each of said fibers at a location remote from said member, said additional members being closer to said members than are said locations remote from said member.

17. The method of interconnecting a duality of optical fibers each of which has a core, a cladding around said core defining a cylindrical outer surface, a flat end face perpendicular to its axis, and a corner between said end face and said cylindrical surface, comprising the steps of
forming in a member an opening having two outer ends, an intermediate portion of relatively small lateral dimension which is less than the diameter of said cladding and greater than the diameter of said core, and two axially aligned tapered portions positioned one on either side of said intermediate portion,
with each of said tapered portions being defined by a wall tapering inwardly toward said intermediate portion,
introducing a quantity of optical fluid into said opening, and then pressing one of said optical fibers into each of said outer ends so as to bring said corner thereof into engagement with said wall of one of said tapered portions and to cause said walls to align the axes of said fibers with the axes of said tapered portios and therefore with each other, and to position said end faces in spaced adjacency,
with said optical fibers displacing some of said optical fluid so that said optical fluid fills the space between said end faces.

* * * * *